(12) United States Patent
Fontana et al.

(10) Patent No.: US 6,811,231 B1
(45) Date of Patent: Nov. 2, 2004

(54) CONNECTION DEVICE FOR CABINETS OF ELECTRICAL PANELS

(75) Inventors: Rodolfo Fontana, Clivio (IT); Cristian Cagliani, Molteno (IT)

(73) Assignee: ABB Service S.r.l. (IT)

( * ) Notice: Subject to any disclaimer, the term of this patent is extended or adjusted under 35 U.S.C. 154(b) by 0 days.

(21) Appl. No.: 10/168,304

(22) PCT Filed: Nov. 8, 2000

(86) PCT No.: PCT/EP00/11239

§ 371 (c)(1),
(2), (4) Date: Oct. 9, 2002

(87) PCT Pub. No.: WO01/47079

PCT Pub. Date: Jun. 28, 2001

(30) Foreign Application Priority Data

Dec. 21, 1999 (IT) .......................... MI99A2672

(51) Int. Cl.⁷ .............................. A47B 47/00
(52) U.S. Cl. ................................. 312/265.1
(58) Field of Search .......... 312/265.1, 265.2, 312/265.4, 223.1, 265.3, 265.5, 111, 257.1, 140; 403/170, 217, 293; 52/653.1, 653.2

(56) References Cited

U.S. PATENT DOCUMENTS 5,498,073 A * 3/1996 Charbonneau et al. ... 312/257.1

FOREIGN PATENT DOCUMENTS

| DE | 3033114 A1 | | 3/1982 |
| EP | 000538046 A1 | * | 4/1993 |
| GB | 2253456 A | | 9/1992 |

* cited by examiner

Primary Examiner—James O. Hansen
(74) Attorney, Agent, or Firm—Connolly, Bove, Lodge & Hutz LLP

(57) ABSTRACT

A device for connection between a first structural element and a second structural element of a cabinet for an electrical panel, whose particularity consists of the fact that it comprises a substantially flat body for resting against an abutment surface formed by the first element, at least one pair of protruding wings being formed on the flat body and being suitable to enter corresponding slots formed in the first element and to geometrically mate in seats formed in the second element.

20 Claims, 4 Drawing Sheets

CONNECTION DEVICE FOR CABINETS OF ELECTRICAL PANELS

BACKGROUND OF THE INVENTION

The present invention relates to a connection device for cabinets of electrical panels and to a cabinet which uses said device; more particularly, the connection device according to the invention allows to connect the structure elements of a cabinet for an electrical panel with a solution which stands out owing to its simplicity both in terms of production and in terms of practical use, allowing to facilitate assembly and reduce the costs entailed by its provision. Generally, cabinets for low-voltage electrical panels are specifically designed and built so as to meet the functional and installation requirements of the components that constitute the panel. It is in fact known that electrical panels use a system of mutually parallel metallic bars, each of which is connected to a corresponding polarity of a power supply system. Inside the cabinet, the bars are electrically connected to the devices used in the panel, for example circuit breakers, and are geometrically coupled to appropriate insulation and support devices; said insulation and support devices, in addition to mutually electrically insulating the bars, allow to connect them to the structure of the cabinet. In this manner, any electrodynamic stresses produced by the flow of current in the bars are discharged onto the structure of the cabinet, which accordingly must have adequate structural strength characteristics. Furthermore, the electrical devices are arranged on one or more fixing guides, which are connected to the frame of the cabinet either directly or by using additional connecting elements. In order to meet these requirements, cabinets are generally provided with a structure shaped like a parallelepiped, inside which there is an adequate space suitable to accommodate the components of the panel and whose frame allows the anchoring of the elements that support said components, of the cladding panels and of the door of the cabinet.

In particular, the frame comprises two subframes which respectively constitute the lower and upper bases of the parallelepipedal structure; said subframes are typically constituted by four angular elements, generally known as three-way corner joints, which are mutually connected in pairs by virtue of profiled elements arranged substantially in a horizontal position and commonly known as cross-members. In turn, the subframes are mutually connected by using vertical profiled elements, or uprights, each of which connects two corresponding joints. Holes are furthermore provided along the vertical extension of the uprights for the direct fixing of the supporting elements of the electrical devices and of the distribution bars, or for the fixing of intermediate cross-members to which said supporting elements are connected.

In the current state of the art, the methods by which the various profiled elements of the frame are mutually connected are not fully satisfactory. The connection between the pairs of elements, for example a corner joint and a cross-member or an upright and a joint, in fact occurs by using a plurality of fixing screws, at least two for each coupling, so as to allow adequate connection and correct mutual positioning of the two elements.

These operations, owing to the number of profiled elements used and therefore to the large number of connections to be provided, require long execution times and a large number of fixing screws; furthermore, in view of the stresses, mainly shear stresses, to which the screws are subjected, said screws may break, consequently entailing a technical drawback.

It is also noted that at least two operators are required in order to correctly perform the connections, so that a first operator keeps the elements to be connected in the correct position and the second one actually produces the various connections; accordingly, the assembly and installation costs of the panel increase.

SUMMARY OF THE INVENTION

The aim of the present invention is to provide a device for connection between a first structural element and a second structural element of a cabinet for an electrical panel which allows to simplify the connection of said elements, facilitating assembly and therefore reducing its time requirements.

Within the scope of this aim, an object of the present invention is to provide a device for connection between a first structural element and a second structural element of a cabinet for an electrical panel which allows an optimum distribution of the stresses to which the connection is subjected, so as to avoid any mechanical failures.

Another object of the present invention is to provide a device for connection between a first structural element and a second structural element of a cabinet for an electrical panel which allows to optimize the use of labor required to provide said panel, with a consequent cost benefit.

Another object of the present invention is to provide a device for connection between a first structural element and a second structural element of a cabinet for an electrical panel which allows to reduce the number of fixing screws used with respect to the known art, accordingly reducing the number of the corresponding fixing operations.

Another object of the present invention is to provide a device for connection between a first structural element and a second structural element of a cabinet for an electrical panel which is highly reliable, relatively easy to manufacture and at competitive costs.

This aim, these objects and others which will become apparent hereinafter are achieved by a device for connection between a first structural element and a second structural element of a cabinet for an electrical panel, characterized in that it comprises a substantially flat body for resting against an abutment surface formed by said first element, at least one pair of protruding wings being formed on said flat body and being suitable to enter corresponding slots formed in the first element and to geometrically mate in seats formed in the second element.

The connection device according to the invention allows simplification of the operations for mutually connecting the two structural elements, allowing to provide faster assembly operations, optimize the use of labor and improve the distribution of the stresses involved.

Further characteristics and advantages of the invention will become apparent from the description of preferred but not exclusive embodiments of the connection device frame according to the invention, illustrated only by way of non-limitative example in the accompanying drawings, wherein:

BRIEF DESCRIPTION OF THE DRAWINGS

In the description that follows, identical reference numerals designate identical or technically equivalent elements.

DETAILED DESCRIPTION OF THE PREFERRED EMBODIMENTS

Figure 1:
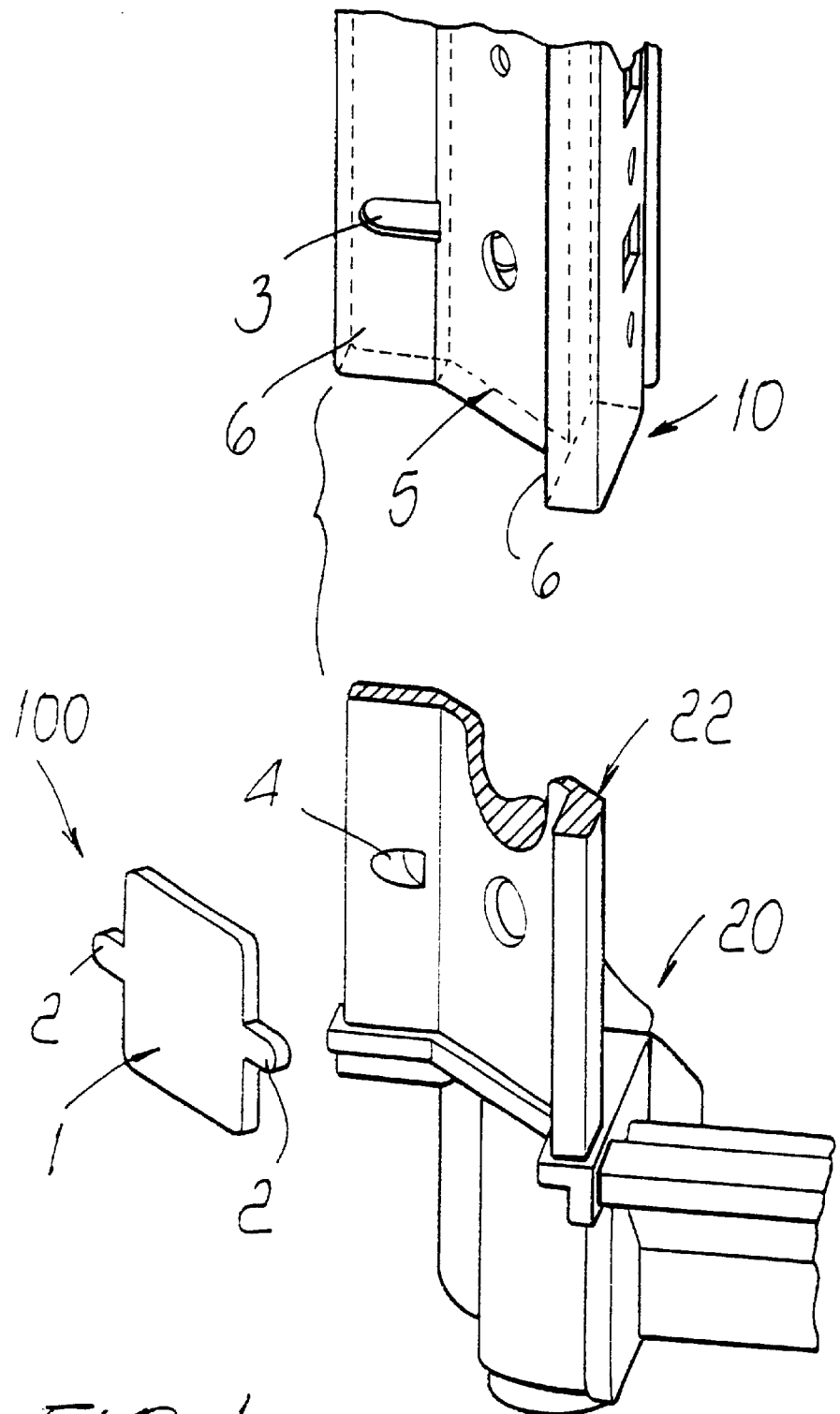
FIG. 1 is an exploded perspective view of a corner joint and of an upright of a cabinet for an electrical panel during connection by using a connection device according to a first embodiment of the invention.

With reference to the above figures, the connection device according to the invention, generally designated by the reference numeral 100, is described in detail with particular reference to its use for the mutual connection of a first structural element 10 and a second structural element 20 of a cabinet for an electrical panel, which are respectively constituted by an upright and a corner joint; said reference is obviously to be considered merely as an example without intending to limit the scope of application in any way.

An embodiment of the upright 10 is described in detail in European patent application no. 98201165.2, whose description is to be assumed included herein by reference. In particular, as shown schematically in FIGS. 1–4, the upright 10 has a substantially flat wall 5 from which two walls 6 protrude in substantially mutually opposite directions at an angle with respect to the wall 5; the upright 10 furthermore has a hollow profiled body so as to form a seat which is suitable to accommodate a portion arm of the corner joint 20. Said upright can be made of metal or plastic material according to the application requirements.

Figure 5:
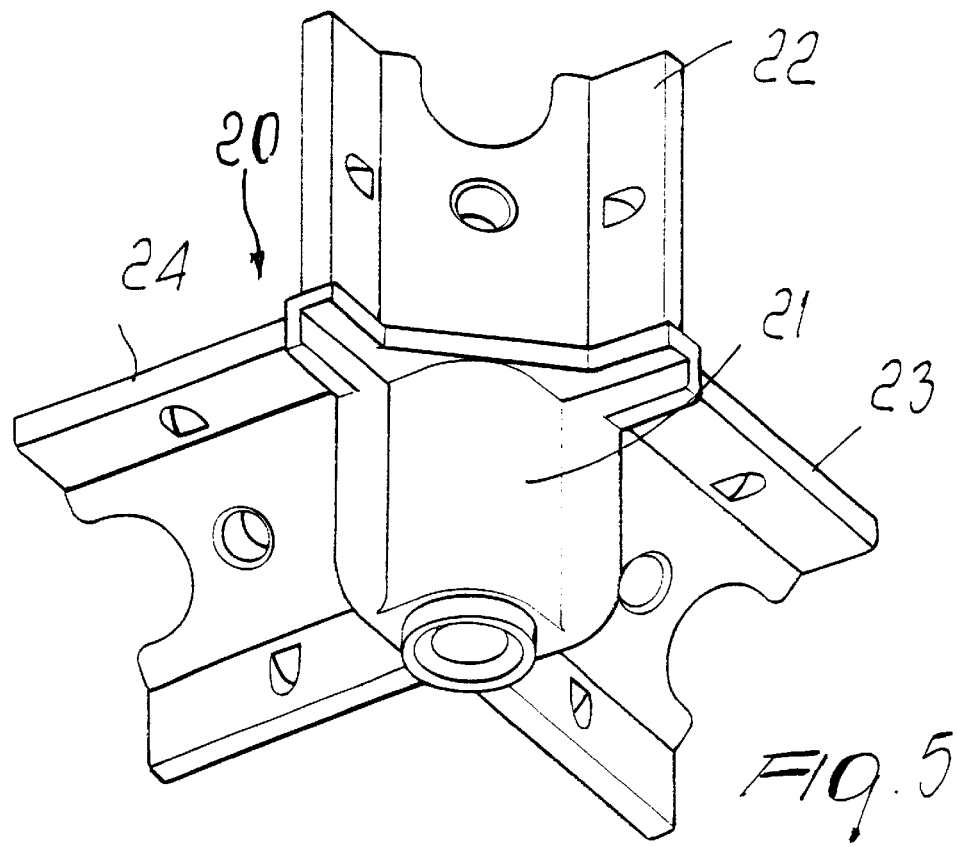
FIG. 5 is a detail perspective view of the corner joint of FIGS. 1–4.

An example of corner joint 20 which can be used in the provision of a cabinet for an electrical panel is shown in detail in FIG. 5; in particular, the joint 20 has a main body 21 which is suitable to be rested against an abutment surface, for example a floor. Three profiled arms protrude from the main body 21 in three substantially mutually perpendicular directions; said profiled arms, respectively designated by the reference numerals 22, 23 and 24, have a geometric cross-section which can be coupled to the seat formed by the upright 10, and are suitable to facilitate connection to further structural elements, for example the upright 10 itself and two cross-members, not shown. The corner joint, too, can be made of metallic or plastic material according to the various application requirements.

Advantageously, the connection device 100 according to the invention comprises a substantially flat body 1 for resting against an abutment surface formed by the wall 5; at least one pair of protruding wings 2 is formed on the flat body 1. The wings 2 are each suitable to enter a corresponding slot 3 formed in the walls 6 of the upright 10 and mate geometrically in seats 4 formed in the corner joint 20. In this manner, the connection between the two structural elements occurs very rapidly and simply by using a component which can be manufactured easily and can be installed even more easily; in this case it is in fact sufficient to insert the arm 22 of the joint 20 inside the seat of the upright 10, moving the slots 3 so that they overlap the seats 4, and applying the device 100 so that the wings 2 cross said slots 3 and enter the seats 4. As shown in FIGS. 1–4, the flat body 1 has a substantially quadrilateral profile in which the wings 2 are arranged on two substantially parallel sides thereof. In this manner, the stresses that the connection must withstand, mainly shear stresses, are distributed along the contact surfaces formed between the wings 2 and the walls of the seats 4, avoiding the creation of dangerous stress concentrations.

As an alternative, the shape of the body 1, as well as the number, the shape and the arrangement of the wings 2 might be changed appropriately according to particular requirements and/or specific applications.

Figure 2:
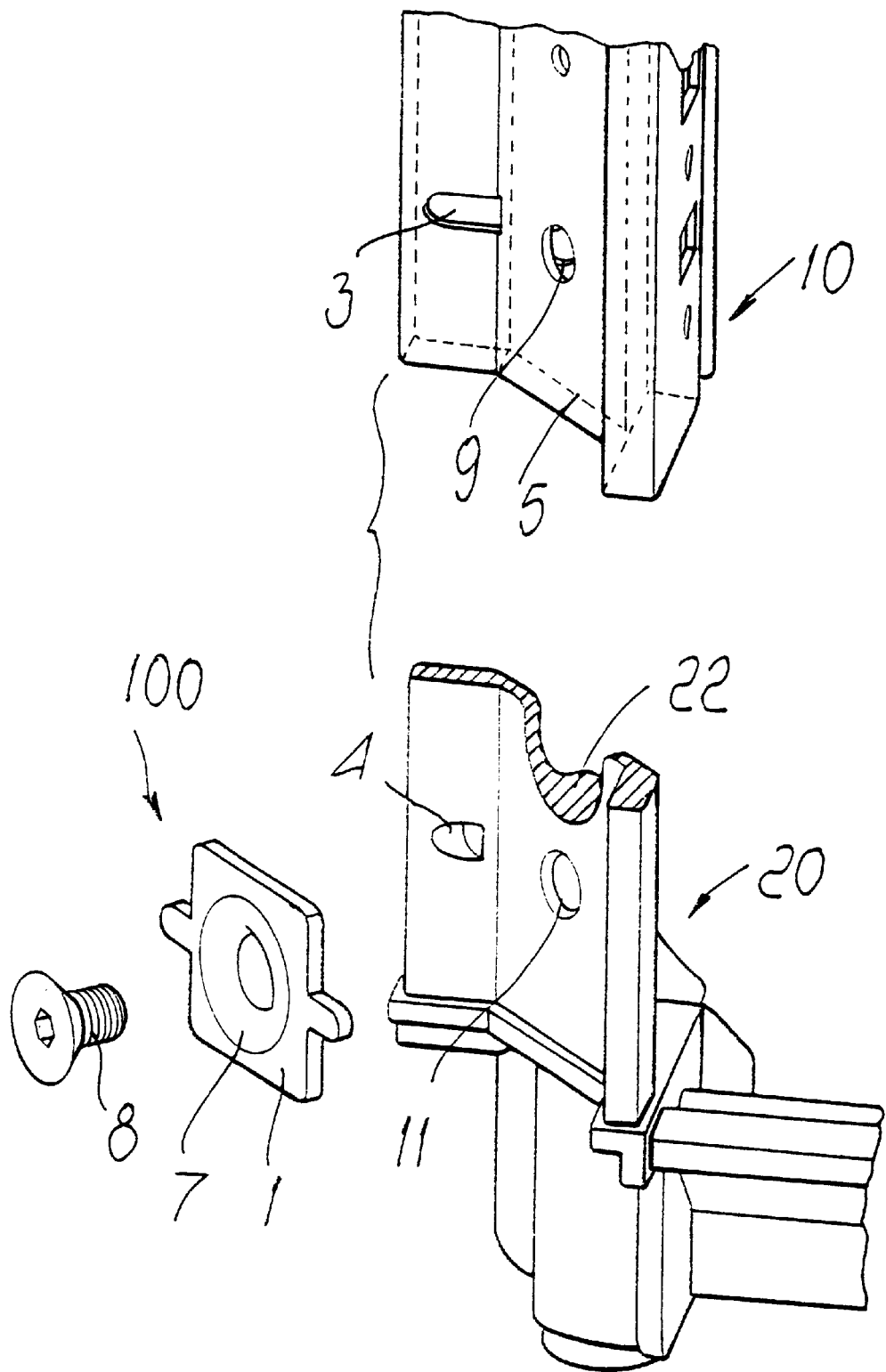
FIG. 2 is an exploded perspective view of a corner joint and of an upright of a cabinet for an electrical panel during connection by using a connection device according to a preferred embodiment of the invention.
Figure 3:
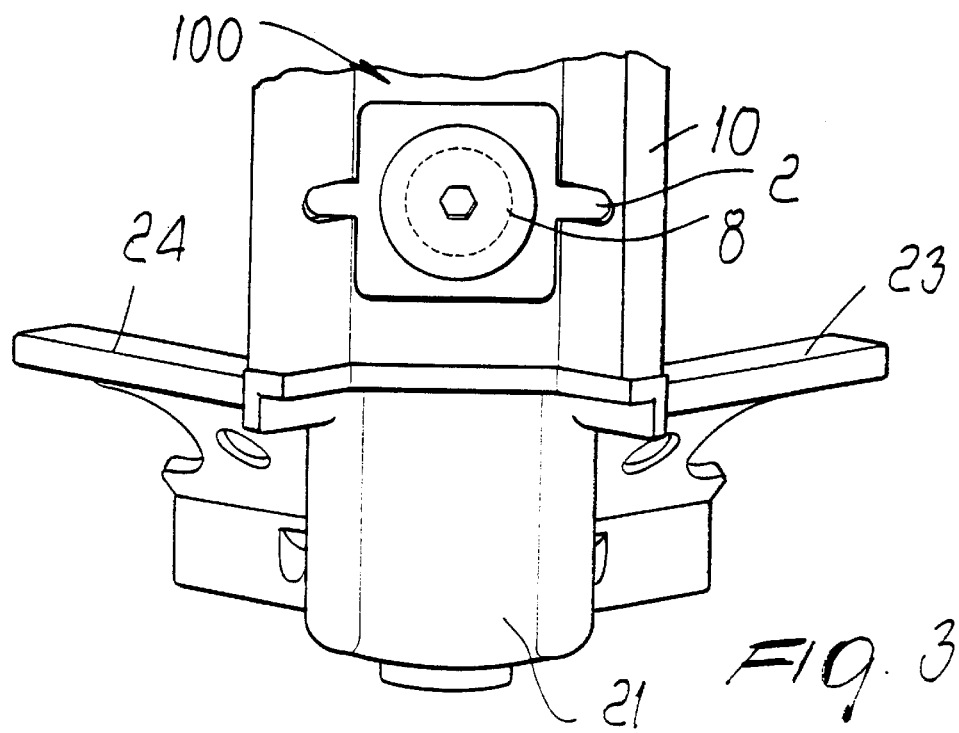
FIG. 3 is a view of the elements of FIG. 2 after connection has been performed.

As shown in detail in FIG. 2, in a preferred embodiment the body 1 has a hole with a rounded flared rim 7 which is suitable to accommodate means for the mutual fixing of the upright 10 and the corner joint 20; in particular, in the illustrated embodiment, the fixing means comprise a threaded screw with a countersunk head 8 which is suitable to be inserted in a through hole 9 formed in the wall 5 and to be screwed into a threaded hole 11 formed in the arm 22. This further improves the connection between the two elements 1 and 10, with an additional surface for the distribution of the stresses involved and with an increase in the reliability of said connection. Furthermore, after connection has occurred, as shown in FIG. 3, the countersunk head of the screw 8 is practically recessed in the space formed by the rounded rim 7, avoiding the presence of protruding sharp elements.

Figure 4:
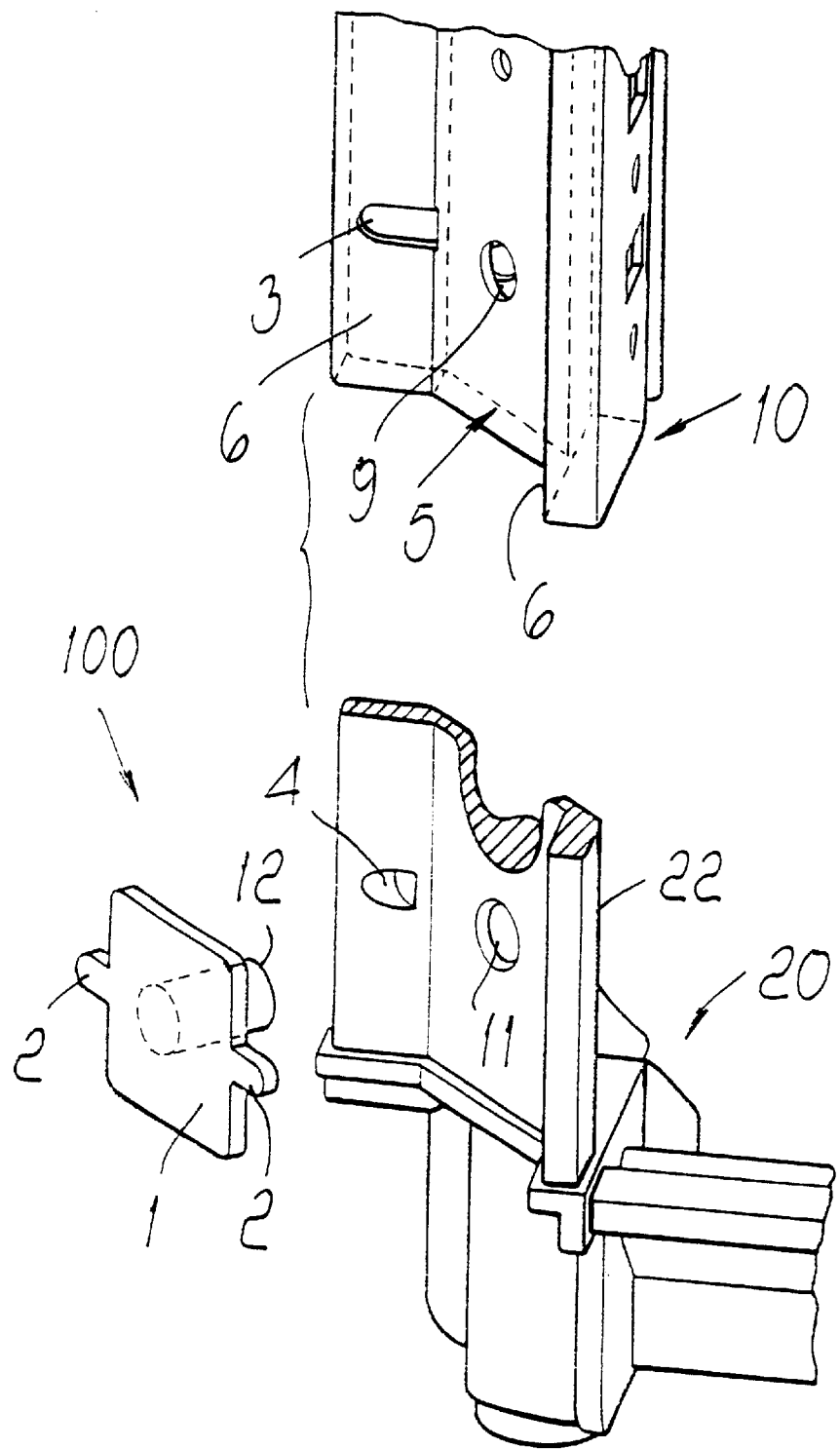
FIG. 4 is an exploded perspective view of a corner joint and of an upright of a cabinet for an electrical panel during connection by using a connection device according to another embodiment of the invention.

In another embodiment of the connection device according to the invention, shown schematically in FIG. 4, the flat body 1 has, in a substantially central position, a protruding coupling pin 12 which is suitable to be inserted in the through hole 9 formed in the upright 10 and to geometrically couple in the seat 11 formed in the joint 20; said coupling can be obtained for example with an interference fit, applying a slight pressure to the body 1 upon insertion in the seat 11.

As an alternative, according to an embodiment which is not shown, the pin 12 might be replaced with an appropriately shaped protruding pin which couples for example with a snap action inside a seat 11 which is shaped correspondingly.

The connection device according to the invention can be advantageously used to connect any two elements of the cabinet, for example a corner joint 20 and a cross-member, in a manner which is fully similar to what has been described for the connection between the joint 20 and the upright 10; in this case, and with enormous advantages from the point of view of production, an element which has substantially the same profile as the upright 10 can be used as a cross-member. Accordingly, it is also possible to have a cabinet in which the three arms 22, 23 and 24 of a joint 20 are respectively connected to an upright 10, to a first cross-member and to a second cross-member by using a device according to the invention for each connection.

In practice it has been found that the connection device according to the invention fully achieves the intended aim and objects, since it allows to simplify the connection between two structural elements of a cabinet of an electrical panel according to a simple and cheap solution.

Attention is drawn to the fact that all the innovative functions and the inventive aspects of the device can be obtained by using commonly commercially available elements and materials with extremely modest costs; for example, the flat body 1 can be manufactured by using an ordinary metallic or plastic material.

The device thus conceived is susceptible of numerous modifications and variations, all of which are within the scope of the inventive concept; all the details may furthermore be replaced with other technically equivalent elements. In practice, the materials used, as well as the dimensions, may be any according to requirements and the state of the art.

What is claimed is:

1. A cabinet for an electrical panel comprising:
   a first structural element having a substantially flat central wall from which two lateral walls protrude in substantially mutually opposite directions at an angle with respect to said central walls, said first structural element having a hollow profiled body forming a seat;
   a second structural element which is a corner joint having a main body and three profiled arms protruding from said main body in three substantially mutually perpendicular directions, said profiled arms having a geometric cross-section coupling with said seat formed in said first structural element; and
   a connection device mutually connecting said first and second structural elements, said connection device having a substantially flat body resting against an abutment surface of said central wall, and at least a pair of protruding wings formed on said flat body, said wings entering corresponding slots formed in said lateral walls and mating geometrically in seats formed in the corner joint.

2. The cabinet according to claim 1, wherein said flat body has a substantially quadrilateral profile in which the wings are arranged on two sides of the flat body which are substantially parallel.

3. The cabinet according to claim 2, wherein said flat body has a hole with a flared rim which is suitable to accommodate means for mutually fixing said first and second structural elements.

4. The cabinet according to claim 3, wherein said fixing means comprise a threaded screw with a countersunk head which is suitable to be inserted in a through hole formed in the first element and to be screwed into a threaded hole formed in the second structural element.

5. The cabinet according to claim 4, wherein the first structural element is an upright.

6. The cabinet according to claim 4, wherein the first structural element is a cross-member.

7. The cabinet according to claim 3, wherein the first structural element is an upright.

8. The cabinet according to claim 3, wherein the first structural element is a cross-member.

9. The cabinet according to claim 2, characterized in that said flat body has a protruding coupling pin which is suitable to be inserted in a through hole formed in the first element and is suitable to mate geometrically in a seat formed in the second structural element.

10. The cabinet according to claim 9, wherein the first structural element is an upright.

11. The cabinet according to claim 9, wherein the first structural element is a cross-member.

12. The cabinet according to claim 2, wherein said flat body has a protruding pin which is suitable to be inserted in a through hole formed in the first element and to couple geometrically by snap action in a seat formed in the second structural element.

13. The cabinet according to claim 12, wherein the first structural element is an upright.

14. The cabinet according to claim 12, wherein the first structural element is a cross-member.

15. The cabinet according to claim 2, wherein the first structural element is an upright.

16. The cabinet according to claim 2, wherein the first structural element is a cross-member.

17. The cabinet according to claim 1, wherein said first structural element is an upright.

18. The cabinet according to claim 1, wherein said first structural element is a cross-member.

19. A cabinet for electrical panel according to claim 1, wherein said three profiled arms of said second structural elements are coupled with corresponding first structural elements, one of said first structural elements being an upright, two of said first structural elements being cross-members, said first and second structural elements being connected by corresponding connection devices.

20. A cabinet for electrical panel according to claim 19, comprising a plurality of said first structural elements and a plurality of said second structural elements which are mutually coupled so as to provide a substantially parallelepipedal configuration, wherein said first and second structural elements are connected by corresponding connection devices.

* * * * *